United States Patent
Basak et al.

(10) Patent No.: US 11,851,354 B2
(45) Date of Patent: Dec. 26, 2023

(54) PROCESS FOR THE TREATMENT OF WASTE WATER

(71) Applicant: SHELL OIL COMPANY, Houston, TX (US)

(72) Inventors: Kaushik Basak, Singapore (SG); Arian Van Mourik, Amsterdam (NL); Nishith Verma, Kanpur U.P. (IN); Ashish Yadav, Kanpur U.P. (IN)

(73) Assignee: SHELL USA, INC., Houston, TX (US)

( * ) Notice: Subject to any disclaimer, the term of this patent is extended or adjusted under 35 U.S.C. 154(b) by 380 days.

(21) Appl. No.: 16/765,712

(22) PCT Filed: Nov. 20, 2018

(86) PCT No.: PCT/EP2018/081851
§ 371 (c)(1),
(2) Date: May 20, 2020

(87) PCT Pub. No.: WO2019/101710
PCT Pub. Date: May 31, 2019

(65) Prior Publication Data
US 2020/0308030 A1 Oct. 1, 2020

(30) Foreign Application Priority Data
Nov. 23, 2017 (IN) .............................. 201741042021

(51) Int. Cl.
*C02F 1/72* (2023.01)
*C02F 103/36* (2006.01)
(Continued)

(52) U.S. Cl.
CPC ............... *C02F 1/725* (2013.01); *B01J 21/18* (2013.01); *B01J 35/0013* (2013.01);
(Continued)

(58) Field of Classification Search
CPC ............... C02F 1/725; C02F 1/74; C02F 1/78
See application file for complete search history.

(56) References Cited

U.S. PATENT DOCUMENTS

| 1,617,014 A | 2/1927 | Derleth |
| 4,066,538 A | 1/1978 | Cines et al. |

(Continued)

FOREIGN PATENT DOCUMENTS

| CN | 1673118 A | 9/2005 |
| CN | 104108780 A | 10/2014 |

(Continued)

OTHER PUBLICATIONS

Gallego et al., The Use of Wet Oxidation and PACT® for the Treatment of Propylene Oxide/Styrene Monomer (PO/SM) Industrial Wastewaters at the Repsol PO/SM Plant in Tarragona, Spain (2002) ("Gallego"), available at https://bit.ly/3RPc7j7. (Year: 2002).*

(Continued)

*Primary Examiner* — Bradley R Spies
(74) *Attorney, Agent, or Firm* — SHELL USA, INC.

(57) ABSTRACT

The invention provides a process for treating waste water from an industrial process for producing propylene oxide, which comprises subjecting the waste water to a catalytic wet oxidation treatment comprising: feeding a stream comprising the waste water to a reactor; subjecting the stream comprising the waste water to an oxidation treatment in the presence of oxygen and a catalyst resulting in a treated stream; sending at least part of the treated stream to a separator wherein the treated stream is separated into a gas stream and a liquid stream; and recycling part of the liquid stream to the reactor.

11 Claims, 1 Drawing Sheet

US 11,851,354 B2
Page 2

(51) Int. Cl.
*B01J 21/18* (2006.01)
*B01J 35/00* (2006.01)
*C02F 1/74* (2023.01)

(52) U.S. Cl.
CPC ............... *C02F 1/727* (2013.01); *C02F 1/74* (2013.01); *C02F 2103/36* (2013.01); *C02F 2301/046* (2013.01); *C02F 2305/08* (2013.01)

(56) References Cited

U.S. PATENT DOCUMENTS

| | | | |
|---|---|---|---|
| 4,970,005 | A | 11/1990 | Schuchardt |
| 5,675,055 | A | 10/1997 | Evans et al. |
| 5,993,673 | A | 11/1999 | Evans et al. |
| 6,500,310 | B1 * | 12/2002 | Dee .................... B01D 3/146 585/800 |
| 6,712,882 | B1 | 3/2004 | De Bie et al. |
| 2001/0022290 | A1 | 9/2001 | Shiota et al. |
| 2013/0319946 | A1 | 12/2013 | Sharma et al. |
| 2015/0005626 | A1 | 1/2015 | Kaneko |
| 2015/0056260 | A1 | 2/2015 | Verma et al. |

FOREIGN PATENT DOCUMENTS

| | | |
|---|---|---|
| CN | 105712460 A | 6/2016 |
| CN | 106348420 A | 1/2017 |
| GB | 2262052 A | 6/1993 |
| JP | 2000117109 A | 4/2000 |
| JP | 2000117272 A | 4/2000 |
| JP | 2000117273 A | 4/2000 |
| JP | 2003236363 A | 8/2003 |
| JP | 2005313155 A | 11/2005 |
| JP | 2005313155 A * | 11/2005 |
| RU | 2428381 C1 | 9/2011 |
| WO | 9967003 A1 | 12/1999 |
| WO | 0100534 A1 | 1/2001 |
| WO | 0132561 A1 | 5/2001 |
| WO | 2006104222 A1 | 10/2006 |
| WO | 2009138530 A1 | 11/2009 |
| WO | 2014172066 A1 | 10/2014 |

OTHER PUBLICATIONS

Yadav et al., Removal of phenol from water by catalytic wet air oxidation using carbon bead—supported iron nanoparticle—containing carbon nanofibers in an especially configured reactor, 4, J. Environ. Chem. Eng., 1504, 1504-1513. (Year: 2016).*
Office Action Received for Russian Application No. 2020116378, dated Feb. 10, 2022, 11 Pages(5 Pages of English Translation and 6 Pages of Official Copy).
Office Action Received for Japanese Application No. 2020-528208, dated Aug. 30, 2022, 6 Pages(3 Pages of English Translation and 3 Pages of Official Copy).
Office Action Received for CN Application No. 201880072936.1, dated Nov. 16, 2021, 20 Pages(11 Pages of English Translation and 09 Pages of Official Copy).
Office Action Received for Japanese Application No. 2020-528208, dated Jan. 31, 2023, 13Pages (9 Pages of English Translation and 4 Pages of Official Copy).
International Search Report and Written Opinion received for PCT Patent Application No. PCT/EP2018/081851, dated Jan. 24, 2019, 08 pages.
Zimmerman, Zimpro® Wet Air Oxidation System: Innovative Technologies for Difficult Waste Water Treatment Problems, 8 pages.
Gallego et al., "The Use of Wet Oxidation and PACT@ for the Treatment of Propylene Oxide/Styrene Monomer (PO/SM) Industrial Wastewaters at the Repsol PO/SM Plant in Tarragona, Spain", Presented at: CHISA 2002, Praha, The Czech Republic, Aug. 25-29, 2002, Technical Report No. 429, 14 pages.
Sharma et al., "Iron Doped Phenolic Resin Based Activated Carbon Micro and Nanoparticles by Milling: Synthesis, Characterization and Application in Arsenic Removal", Chemical Engineering Science, vol. 65, Issue No. 11, 2010, pp. 3591-3601.
Saraswat et al., "Development of Novel in Situ Nickel-doped, Phenolic Resin-based Micro-nano-activated Carbon Adsorbents for the Removal of Vitamin B-12", Chemical Engineering Journal, vol. 197, Jul. 15, 2012, pp. 250-260.
Khare et al., "Synthesis of Phenolic Precursor-based Porous Carbon Beads in Situ Dispersed With Copper-silver Bimetal Nanoparticles for Antibacterial Applications", Journal of Colloid and Interface Science, vol. 418, Mar. 15, 2014, pp. 216-224.
Khare et al., "Carbon Nanofibers Containing Metal-doped Porous Carbon Beads for Environmental Remediation Applications", Chemical engineering journal, vol. 229, 2013, pp. 72-81.
Talreja et al., "Removal of Hexavalent Chromium From Water Using Fe-grown Carbon Nanofibers Containing Porous Carbon Microbeads", Journal of Water Process Engineering, vol. 3, 2014, p. 34-45.
Zerfa et al., "Vinyl Chloride Dispersion With Relation to Suspension Polymerisation", Chemical Engineering Science, vol. 51, Issue No. 14, Jul. 1996, pp. 3591-3611.

* cited by examiner

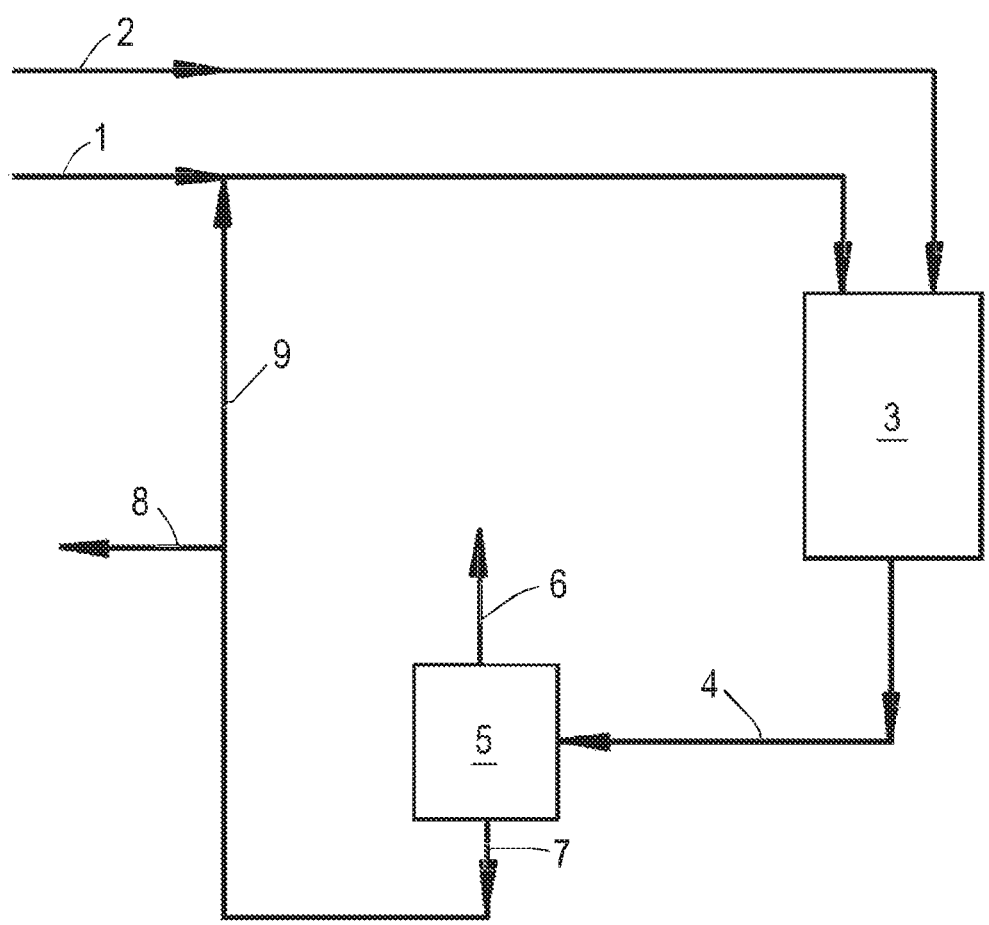

PROCESS FOR THE TREATMENT OF WASTE WATER

CROSS REFERENCE TO RELATED APPLICATIONS

This is a national stage application of International application No. PCT/EP2018/081851, filed 20 Nov. 2018, which claims priority of India application No. 201741042021, filed 23 Nov. 2017.

FIELD OF THE INVENTION

The present invention relates to a process for treating waste water originating from industrial processes which may contain hydrocarbons and salts, in particular waste water from an industrial process for producing propylene oxide.

BACKGROUND OF THE INVENTION

The treatment or purification of waste water originating from industrial processes and containing at least hydrocarbons and salts (organic and/or inorganic) normally is a relatively expensive procedure. Environmental legislation nowadays puts stringent demands on the purification of waste water streams from industrial processes, particularly when the purified waste water is to be released into the environment. Accordingly, the choice of a purification method for industrial waste water is bound by practical, environmental and economic considerations.

Processes for the production of propylene oxide (PO) give rise to waste water streams that provide particular challenges with regard to purification. Propylene oxide may be produced by the direct oxidation of propylene with air or oxygen. As such direct oxidation tends to provide low yields of PO, PO is most commonly produced with the help of a chemical mediator, which often consists of an organic or inorganic peroxide.

One industrial process for the production of propylene oxide wherein a relatively large amount of waste water is produced is the styrene monomer/propylene oxide (SM/PO) production process. In general, SM/PO processes involve the steps of: (i) reacting ethylbenzene with oxygen or air to form ethylbenzene hydroperoxide, (ii) reacting the ethylbenzene hydroperoxide thus obtained with propene in the presence of an epoxidation catalyst to yield propylene oxide and 1-phenyl ethanol, and (iii) converting the 1-phenyl ethanol into styrene by dehydration using a suitable dehydration catalyst. In the last step, water is produced. In addition to this reaction water, organic by-products such as aliphatic and aromatic hydrocarbons, aldehydes, ketones, alcohols, phenols and organic acids are produced. The by-products are separated from the main products either by separation techniques like distillation or absorption or in case of organic acids, via neutralization using a basic aqueous solution, such as an aqueous sodium (bi)carbonate and/or sodium hydroxide solution. Furthermore, additional water is introduced with the air in step (i) and as steam in step (iii) of the above process, as well as reaction water formed in step (iii). These streams also become part of the plant wastewater stream.

The waste water from an SM/PO production plant typically contains a total of from 1.0 to 3.5 wt. % of non-salt organic compounds and from 3.0 to 6.0 wt. % of organic salts. It may further contain up to 3.0 wt. % of sodium carbonate and sodium bicarbonate and/or traces of sodium hydroxide, depending on the basic solution used in the neutralization of organic acids.

The output of waste water from an SM/PO plant can be tens of thousands kg per hour and this cannot be discharged without additional purification treatment. As has already been indicated above, however, the choice of a suitable purification treatment is limited due to practical, environmental and economic considerations.

Another phenyl hydroperoxide that can be used in production of propylene oxide is cumene hydroperoxide (2-hydroperoxypropan-2-ylbenzene), typically obtained by reacting cumene ((1-methylethyl)benzene)) with oxygen or air. Cumene hydroperoxide is reacted with propylene in the presence of an epoxidation catalyst to yield PO and cumyl alcohol (2-phenylpropan-2-ol). Cumyl alcohol, also referred to as dimethylphenylcarbinol (DMPC), is typically converted into cumene with the help of a heterogeneous catalyst and hydrogen, by hydrogenolysis. The cumene may then be re-used in the process.

Waste water originating from such processes may comprise oxygen-containing compounds having phenolic hydroxyl groups or carbonyl groups. Typical contaminants may include ketones such as acetone, ethylmethylketone and diethylketone, aldehydes such as formaldehyde, acetaldehyde and propionaldehyde, ethers, aromatic and non-aromatic alcohols such as phenols and methanol, chlorinated compounds such as dichloropropane and organic sodium salts such as sodium acetate, sodium formate, sodium benzoate, sodium propionate and sodium oxalate.

The purification of waste water streams originating from the production of propylene oxide presents particular challenges as such streams often have larger chemical oxygen demands (COD) than waste water streams originating from other chemical processes. For example, typical starting COD values for waste water streams originating from the production of propylene oxide are in the range of 80,000 to 125,000 mg/L. Therefore, purification methods for such waste water streams need to be able to reduce COD by significant amounts in absolute terms as well as percentage terms.

The typical purification method employed in industrial processes for the purification of waste water streams originating from the production of propylene oxide comprises a liquid phase oxidation with air or oxygen at high temperatures and pressures (a so-called Wet Air Oxidation (WAO) process).

Wet air oxidation is a well-known technology for treating process streams and was first developed in the 1930's by F. J. Zimmermann. This technology utilizes aqueous phase oxidation of process streams by oxygen-containing gas at elevated temperatures and pressures in order to oxidise inorganic contaminants and to convert organic contaminants to carbon dioxide, water and biodegradable short chain organic compounds.

Wet air oxidation is typically carried out for the purification of waste water streams originating from the production of propylene oxide using temperatures of greater than 300° C. and pressures of over 200 bar (20 MPa). However, as the effluent from said wet air oxidation processes still has a significant COD, industrial processes for the purification of waste water streams originating from the production of propylene oxide often require additional downstream processing steps.

For example, such processes may employ a two-step process, wherein the first step comprises a liquid phase oxidation with air or oxygen at high temperatures and pressures (the so-called Wet Air Oxidation (WAO) process) and the second step comprises biochemical treatment.

In some purification processes, there may be further optional steps such as treatments with activated carbon prior to biochemical treatment. For example, U.S. Pat. No. 4,066,538 A describes a process for treating waste water having a relatively high chemical oxygen demand (COD) caused by organic material that is predominantly soluble in water. Said process comprises treatment with activated carbon, followed by a biochemical treating operation.

Repsol has presented (CHISA 2002, Praha, Czech Republic, Aug. 25-29, 2002) a process for the treatment of propylene oxide/styrene monomer industrial waste waters, wherein the effluent from wet air oxidation is treated in a two-stage activated carbon treatment in which a homogeneous mixture of powdered activated carbon and biological solids treat the waste water in a synergistic fashion. It was indicated that the wet air oxidation treatment was carried out at 295° C., 95 bar (9.5 MPa) for 1.5 hours using compressed oxygen gas as the oxidant.

However, multi-step processes comprising wet air oxidation and biochemical treatments suffer from high cost and other disadvantages including equipment reliability issues, corrosion, fouling and downtime due the extreme operating conditions that need to be employed during wet air oxidation and may produce other waste streams like spent activated carbon. Accordingly, over the years, there have been various alternative methods described for the purification of waste water streams originating from processes for the production of propylene oxide.

The purification process disclosed in GB 2,262,052 A involves freeze-concentration combined with salts-removal, whereby the waste water is separated into an at least two-fold concentrated waste product, salt crystals and a substantially pure water product. However, the economics of a freeze concentration process are not satisfactory and the capital investment required for a freeze concentration process at present still accounts for at least 10% of the total capital investment necessary for an SM/PO plant.

WO 99/67003 A1 discloses a process for treating of waste water streams containing at least hydrocarbons and salts to yield a clean water product, a concentrated brine product and a hydrocarbon-rich product, which process comprises the steps of:
(a) feeding the waste water feed into a first distillation column at a stage in the range of from 0.05*n to 0.15*n from the top, wherein n represents the total number of theoretical stages of the first distillation column and has a value in the range of from 20 to 40;
(b) drawing off a vapour stream at a stage in the range of from 0.55*n to 0.75*n from the top and feeding this vapour stream into the bottom of a second distillation column having m theoretical stages, with m having a value in the range of from 3 to 10;
(c) drawing off the clean water product as the top fraction from the second distillation column and drawing off a bottom stream from the second distillation column, which is fed back into the first distillation column below the draw off of the vapour stream in step (b) at a stage in the range of from 0.60*n to 0.85*n from the top;
(d) drawing off the concentrated brine product as the bottom fraction of the first distillation column; and
(e) drawing off the hydrocarbon stream as the top fraction of the first distillation column. The process of WO 99/67003 A1 is said to require 10-50% lower capital investment than for freeze concentration processes as disclosed in GB 2,262,052 A, whilst also achieving good purification.

U.S. Pat. No. 5,993,673 A describes a process for purifying an aqueous purge stream from propylene oxide/styrene monomer production containing organic acids, peroxidic materials and ethyl benzene which comprises contacting the purge stream with a particulate solid catalyst comprised of iron-promoted alumina at conditions effective to decompose peroxidic materials, and recovering the treated stream reduced in peroxide content. Thereafter, the treated stream of U.S. Pat. No. 5,993,673 A may be stripped of ethyl benzene and then effectively biotreated.

WO 01/00534 A1 discloses an improved process for the treatment of a waste water feed containing organic contaminants, which process comprises as step (a), the freeze concentration process as described in GB 2262052 A, followed by (b) subjecting the resulting water stream to a reverse osmosis treatment thereby producing a purified water stream as the permeate and a relatively contaminated water stream as retentate. However, such a method may present potential difficulties in relation to solids handling rotating equipment can be sensitive to fouling.

WO 01/32561 A1 discloses an industrial process for producing propylene oxide, which process comprises the steps of:
(a) subjecting the waste water to a multi-effect evaporation treatment resulting in a vaporous top fraction and a liquid bottom fraction containing the non-volatile contaminants; and
(b) condensing at least part of the vaporous top fraction into a liquid stream which is subjected to a stripping treatment resulting in an overhead stream containing volatile waste organic material and purified water as the liquid bottom stream.

The purified water obtained by the process of WO 01/32561 A1 is sufficiently pure to be re-used in an industrial process as e.g. cooling water, but can also be subjected to a subsequent biotreatment resulting in a pure water stream, which may be sufficiently pure for discharge into surface water.

However, the process of WO 01/32561 A1 requires the evaporation of a very high fraction of water, thereby necessitating the high energy consumption and the use of high capacity distillation columns.

WO 2006/104222 A1 describes a method for treating a waste water containing oxygen-containing compound having a phenolic hydroxyl group or a carbonyl group, including a step of adding an alkali agent to the waste water containing the oxygen-containing compound having a phenolic hydroxyl group or a carbonyl group to control a pH of the waste water to 10 or more; and a step of separating a discharge in which the oxygen-containing compound having a phenolic hydroxyl group or a carbonyl group is concentrated through distillation of the waste water to which the alkali agent has been added.

WO 2009/138530 A provides a method for revaluation of aqueous waste streams generated in propylene oxide and styrene co-production processes, wherein said method comprises acidification of the aqueous waste stream with an inorganic acid at a pH of less than 4.5, separation of the two resulting phases at a temperature of greater than 40° C.; washing of the organic phase produced in the previous step with an aqueous solution of excess acid and separation of the two resulting phases.

However, the method described in WO 2009/138530 A presents a number of difficulties, including potential corrosion issues, acid handling and consumption, managing the organics dissolved in the aqueous phase and potential formation of esters with organic alcohols.

In spite of the amount of research that has been dedicated to the purification of waste water streams originating from processes to produce propylene oxide, there still remains a desire to develop simpler, more cost effective waste water purification treatments that do not suffer from equipment reliability issues and which produce clean water streams that may be discharged into the environment. In particular, it is desired to purify waste water streams originating from processes for the production of propylene oxide under milder conditions and with advantageous COD reduction, both in absolute and percentage terms.

SUMMARY OF THE INVENTION

Surprisingly, in the present invention, a waste water treatment process has been found that may result in one or more of the above-mentioned desired improvements, which process involves catalytic wet oxidation treatment of the waste water in combination with recycling part of the liquid stream to the reactor after the oxidation treatment in said reactor and after separating the treated stream into a liquid stream and a gas stream.

Accordingly, the present invention relates to a process for treating waste water from an industrial process for producing propylene oxide, which comprises subjecting the waste water to a catalytic wet oxidation treatment comprising:

feeding a stream comprising the waste water to a reactor;

subjecting the stream comprising the waste water to an oxidation treatment in the presence of oxygen and a catalyst resulting in a treated stream;

sending at least part of the treated stream to a separator wherein the treated stream is separated into a gas stream and a liquid stream; and recycling part of the liquid stream to the reactor.

BRIEF DESCRIPTION OF THE DRAWING

FIG. 1 shows an embodiment of the waste water treatment process of the present invention.

DETAILED DESCRIPTION OF THE INVENTION

The waste water to be treated in the present invention may be derived from any process for the production of propylene oxide. However, in a preferred embodiment of the present invention, the waste water originates from a process for co-producing propylene oxide and styrene. Hitherto, such waste water streams have been very difficult to treat due to their very high CODs.

As described hereinbefore, wet oxidation processes are known in the art and comprise the oxidation of soluble or suspended components in an aqueous environment using oxygen as the oxidizing agent. When air is used as the source of oxygen the process is referred to as the wet air oxidation (WAO) process.

Wet air oxidation systems typically employ rotating equipment to raise the feed stream and air (or oxygen) to the required operating pressure. Heat exchangers are routinely employed to recover energy from the reactor effluent and use it to preheat the feed/air mixture entering the reactor. After start-up, since the oxidation reactions are exothermic, sufficient energy may be released in the reactor to allow the wet oxidation system to operate without any additional heat input.

As described hereinbefore, non-catalytic wet oxidation processes to purify waste water from propylene oxide production processes are not only high cost, but also suffer from other disadvantages including equipment reliability issues, corrosion, fouling and downtime due the extreme operating conditions that need to be employed.

However, it has been surprisingly found that the catalytic wet oxidation process of the present invention may advantageously be conducted under less extreme operating conditions, even for waste water streams having very high starting CODs.

The oxidation treatment step of the present process may be carried out a temperature in the range of from 120 to 350° C. and at a pressure in the range of from 1 to 30 MPa. However, advantageously, the oxidation treatment step of the process of the present invention may be conveniently conducted at a temperature in the range of from 120 to 300° C. and a pressure in the range of from 2 to 20 MPa. Preferably, said oxidation treatment step may be conducted at a temperature in the range of from 150 to 280° C., more preferably in the range of from 180 to 240° C. and a pressure in the range of from 2 to 15 MPa, more preferably in the range of from 2 to 12 MPa, most preferably in the range of from 2 to 8 MPa. Within the present specification, the pressure is expressed as "gauge pressure".

The process of the present invention may be carried out in a continuous manner.

In the present process, a stream comprising waste water from an industrial process for producing propylene oxide is fed to a reactor. In a preferred embodiment of the invention, the subsequent oxidation treatment step of the process is operated such that the waste water stream achieves advantageous COD reduction both in absolute and percentage terms, without the need for any pre-treatment purification of the waste water prior to implementation of the process of the present invention.

In the oxidation treatment step of the present process, the stream comprising the waste water is subjected to an oxidation treatment in the presence of oxygen and a catalyst. In addition to feeding a stream comprising the waste water to the reactor, a gas stream comprising oxygen and optionally an inert gas may be fed to the reactor. Said gas stream may be fed separately to the reactor or may be fed to the reactor after mixing with the waste water stream. Said inert gas may be any inert gas, for example nitrogen.

The amount of oxygen in the above-mentioned gas stream comprising oxygen and optionally an inert gas may be in the range of from 1 to 100 vol. %, more suitably of from 10 to 100 vol. %, more suitably of from 20 to 100 vol. %, more suitably of from 25 to 100 vol. %, more suitably of from 25 to 95 vol. %, more suitably of from 40 to 85 vol. %, most suitably of from 50 to 75 vol. %. The latter gas stream may comprise one or more inert gases, including for example nitrogen, in an amount which when combined with the amount of oxygen adds up to 100 vol. %.

The above-mentioned gas stream comprising oxygen and optionally an inert gas may be a gas stream consisting of air.

Further, the above-mentioned gas stream comprising oxygen and optionally an inert gas may be a gas stream consisting of a combination of air and an additional amount of one or more inert gases, including for example nitrogen. Said "additional amount of one or more inert gases" does not include the amount of inert gases present in air. In the latter case, the oxygen concentration is lower than that in air, that is to say lower than 21 vol. %. In particular, the amount of oxygen in said gas stream may be in the range of from 1 to lower than 21 vol. %, more suitably of from 1 to 20 vol. %. The latter gas stream comprises one or more inert gases, including for example nitrogen, in an amount which when combined with the amount of oxygen adds up to 100 vol. %.

Preferably, the above-mentioned gas stream comprising oxygen and optionally an inert gas is a gas stream wherein the oxygen concentration is higher than that in air, that is to say higher than 21 vol. %. Said gas stream may be a gas stream wherein the amount of oxygen is in the range of from higher than 21 to 100 vol. %, suitably of from 25 to 100 vol. %, suitably of from 25 to 95 vol. %, suitably of from 40 to 85 vol. %, most suitably of from 50 to 75 vol. %. The latter gas stream may comprise one or more inert gases, including for example nitrogen, in an amount which when combined with the amount of oxygen adds up to 100 vol. %.

The amount of catalyst in the reactor may be conveniently selected depending on the starting COD content of the waste water to be treated and the required COD reduction after the purification has been applied. However, the catalyst is typically used in an amount (in grams) per the feed rate of the stream comprising the waste water (in litres per hour) in the range of from 10 to 300 g/(l/h), more suitably of from 25 to 250 g/(l/h), more suitably of from 35 to 200 g/(l/h), more suitably of from 45 to 150 g/(l/h), most suitably of from 50 to 125 g/(l/h).

Further, in the present process, at least part of the treated stream, that results from the oxidation treatment step, is sent to a separator wherein the treated stream is separated into a gas stream and a liquid stream. Prior to sending the treated stream to the separator, said stream may be cooled, for example by means of heat exchanger.

Finally, in the present process, part of the above separated liquid stream is recycled to the reactor. The relative proportion of the part of the liquid stream that is recycled to the reactor may vary within wide ranges. Preferably, of from 1 to 99% of the liquid stream separated by the separator is recycled to the reactor. More preferably, said relative proportion is in the range of from 5 to 95%, more preferably of from 15 to 95%, more preferably of from 20 to 95%, most preferably of from 25 to 95%. Said relative proportion of the part of the liquid stream that is recycled to the reactor is preferably at least 1%, more preferably at least 2%, more preferably at least 5%, more preferably at least 10%, more preferably at least 15%, more preferably at least 20%, most preferably at least 25%. Further, said relative proportion of the part of the liquid stream that is recycled to the reactor is preferably at most 99%, more preferably at most 98%, more preferably at most 97%, more preferably at most 96%, most preferably at most 95%.

Optionally, in addition to recycling part of the liquid stream separated by the separator, part of the gas stream separated by the separator may also be recycled to the reactor. However, it is preferred that only part of said liquid stream is recycled to the reactor.

Dependent upon the starting COD of the waste water stream and the intended subsequent use of the waste water stream, in some embodiments of the present invention, optional post-treatment steps may be performed. However, for many applications, the high COD reductions achieved by the process of the present invention are sufficient for further post-treatment steps to not be required.

After use in the process of the present invention, spent catalyst may be regenerated and used for subsequent cycles depending on the residual catalytic activity of the catalyst after individual cycles.

As mentioned above, the present waste water treatment process may be conveniently integrated with a SM/PO process.

The waste water treatment process of the present invention is illustrated in FIG. 1. In the process shown in FIG. 1, a stream comprising waste water from an industrial process for producing propylene oxide is fed via feed line 1 to reactor 3. Reactor 3 contains a catalyst and has a downflow configuration. Alternatively, reactor 3 may have an upflow configuration. In addition, a gas stream comprising oxygen and nitrogen is fed separately via line 2 to reactor 3. An electric heater (not shown) is used to heat reactor 3. Alternatively, the waste water stream and gas stream may be combined and heated by means of a heat exchanger (not shown) before entering reactor 3. In reactor 3, the waste water is subjected to an oxidation treatment in the presence of oxygen and the catalyst. The resulting treated stream leaves reactor 3 via line 4 and is optionally cooled by means of a heat exchanger (not shown). The optionally cooled, treated stream is then sent to liquid-gas separator 5 wherein said stream is separated into a gas stream and a liquid stream. The gas stream leaves separator 5 via line 6 and may be cooled and sent to a furnace or other treatment system (not shown). The liquid stream leaves separator 5 via line 7. Said liquid stream is split into 2 substreams. One of these substreams is removed via product line 8. The stream in product line 8 may undergo further purification treatment depending on the final COD specifications that it is required to meet. The other substream is sent via recycle line 9 to feed line 1 and combined with the waste water stream and then recycled to reactor 3.

The oxidation treatment step of the process of the present invention is carried out in the presence of a catalyst. Preferably, the reactor to which the stream comprising the waste water is fed contains said catalyst. Said catalyst may be any catalyst suitable for wet air oxidation of waste water in the presence of oxygen.

A suitable catalyst that may be employed in the oxidation treatment step of the process of the present invention is a catalyst which comprises metal nanoparticles-doped porous carbon beads. Such catalyst for use in the process of the present invention may comprise one or more metals incorporated within polymeric beads. The one or more metals can, for example, be incorporated into the beads during a polymerization step.

As used herein, the term "bead" can refer to a particle or nanoparticle. The size of a particle or nanoparticle is as described herein or as context dictates.

Preferably, the metal therein is selected from one or more of aluminium, iron, nickel, copper, silver, cobalt, molybdenum, gold and platinum. More preferably, the metal is selected from one or more of iron, nickel, copper and cobalt. Most preferably, the metal is selected from one or more of nickel, copper and cobalt. Copper is a particularly preferred metal in the catalyst.

In some embodiments, a combination of metals or salts thereof may be conveniently incorporated into the beads. Examples of preferred combinations include, but are not limited to, iron and copper, copper and nickel, and nickel and iron.

Examples of metal salts that can be used to incorporate metals in the polymeric beads include, but are not limited to, aluminum nitrate, ferric chloride, ferric nitrate, nickel nitrate, cupric chloride, cupric nitrate, silver nitrate, cobalt nitrate, molybdenum nitrate, gold chloride, platinum chloride or any combination thereof.

The above-mentioned catalyst which may be used in the process of the present invention may be generally prepared according to suspension polymerization methods known in the art. For example, A. Sharma et al., Chem. Eng. Sci. 65

(2010) 3591-3601, R. Saraswat et al., Chem. Eng. J. 197 (2012) 250-260, US 2013/0319946 A1, P. Khare et al., J. Colloid. Interface Sci. 418 (2014) 216-224, and US 2015/005626 A1 describe the preparation of various metal nanoparticles-doped porous carbon beads.

Metal nanoparticles-doped porous carbon beads which may be used as a catalyst in the oxidation treatment step of the process of the present invention may generally be prepared by a method comprising: —(i) preparing a mixture of one or more aromatic alcohol monomers and/or non-aromatic monomers, solvent, polymerization catalyst, cross-linking agent, suspension stabilizing agent and one or more metal salts, under conditions sufficient to produce polymeric beads doped with one or more metals or salts thereof; and (ii) carbonizing, activating and then reducing the polymeric beads produced in step (i) to produce metal nanoparticles-doped porous carbon beads.

Aromatic alcohol monomers that may be conveniently used in step (i) may be selected from one or more of phenol, vinyl benzyl alcohol, cresol and butylphenol. A particularly preferred aromatic alcohol monomer is phenol.

A preferred non-aromatic monomer that may be conveniently used in step (i), alone or in combination with one or more aromatic alcohol monomers or other non-aromatic monomers is methyl methacrylate (MMA).

The solvent that may be utilised in preparing the above-mentioned catalyst is not limited and may be any organic solvent or a solvent that is appropriate for the monomers being used to synthesize the polymeric beads. Examples of solvents that may be conveniently used include, but are not limited to, formaldehyde, acetaldehyde, paraldehyde, and glyoxal, or any combination thereof.

The polymerization catalyst may be a base catalyst, and in particular, amine catalysts. Examples of polymerization catalysts that may be conveniently used include, but are not limited to, triethylamine (TEA), sodium hydroxide, barium hydroxide, dimethylamine, which can be used alone or in combination with other catalysts.

Cross-linking agents that may be conveniently used in step (i) include hexamethylenetetramine (also known as HMTA or hexamine), triethylene diamine and sulfuric acid, or any combination thereof.

Suspension stabilizing agents that may be conveniently used in step (i) may be selected from one or more of poly vinyl alcohol (PVA), gum acacia powder (GAP) and poly vinyl pyrrolidone. However, other suspension stabilizing agents can also be used and the list provided herein should not be considered limiting.

The order of addition and mixing of the components in step (i) is not limited. The components for use in step (i) may be added together simultaneously to yield the total reaction mixture for said step. Alternatively, one or more components for use in step (i) may be prepared as separate mixtures and then added together to yield to total reaction mixture.

For example, one convenient non-limiting method of preparing the above-mentioned catalyst that may be used in the process of the present invention comprises heating the monomers, solvent, and polymerization catalyst to form a heated mixture. In some embodiments, the monomers, solvent, and polymerization catalyst may be mixed at room temperature (e.g. 20-30° C.) until the mixture is homogeneous. The mixture can then be heated to a temperature of about 100° C. The mixture can be heated at any rate, including but not limited to 1, 2, 3, 4, or 5° C./minute. After the mixture is heated, the heated mixture may be contacted with a solvent to yield a first mixture. In some embodiments, the solvent is water. In some embodiments, the first mixture is mixed for about, or at least, 10, 20, 30, 40, 50, or 60 minutes. The first mixture may then be contacted with a cross-linking agent. Contacting the first mixture with a cross-linking agent will yield a cross-linked mixture. In some embodiments, after contacting the first mixture with a cross-linking agent, the mixture is heated. In some embodiments, the mixture is heated until the temperature reaches about 70, 80, 90, 100, or 110° C. The temperature can be increased, for example, at a rate of about 1, 2, 3, 4, or 5° C./minute until the target temperature is reached. The cross-linked mixture may then be contacted with a suspension stabilizing agent to yield a second mixture. In some embodiments, the suspension stabilizing agent and cross-linked mixture can be mixed for about, or at least, 10, 15, 20, 25, 30, 35, 40, 45, 50, 55, or 60 minutes. The second mixture may then be contacted with one or more metals or salts thereof to yield a third mixture. In some embodiments, the third mixture can then be heated. After heating the third mixture, the mixture is cooled to produce a composition comprising the polymeric beads. When more than one metal is to be incorporated into the beads, said metals can be added sequentially or simultaneously. For example, in some embodiments wherein multiple metals are to be incorporated into the beads, the metals may be added at different times, such as about, or at least, 1, 2, 3, 4, 5, 6, 7, 8, 9, or 10 minutes apart. In some embodiments, wherein multiple metals are to be incorporated into the beads, the metals may be added about 1 to 10, 1 to 9, 1 to 8, 1 to 7, 1 to 6, 1 to 5, 1 to 4, 1 to 3, or 1 to 2 minutes apart. In some embodiments, wherein multiple metals are to be incorporated into the beads, the metals may be added about 2 to 10, 2 to 9, 2 to 8, 2 to 7, 2 to 6, 2 to 5, 2 to 4, or 2 to 3 minutes apart. In some embodiments, wherein multiple metals are to be incorporated into the beads, the metals may be added about 3 to 10, 3 to 9, 3 to 8, 3 to 7, 3 to 6, 3 to 5, 3 to 4 minutes apart. In some embodiments, wherein multiple metals are to be incorporated into the beads, the metals may be added about 4 to 10, 4 to 9, 4 to 8, 4 to 7, 4 to 6, or 4 to 5 minutes apart. In some embodiments, wherein multiple metals are to be incorporated into the beads, the metals may be added about 5 to 10, 5 to 9, 5 to 8, 5 to 7, or 5 to 6 minutes apart.

In embodiments wherein multiple metals are to be incorporated into the beads, the metals may be added in different ratios to one another. In some embodiments, the first metal (or salt thereof) is added in a 3:1, 1:1, or 1:3 ratio to a second metal (or salt thereof). Other ratios may also be used to affect the final amount of each metal that is incorporated into the polymeric beads.

After the one or more metals or salts thereof are added, the reaction mixture can be continued to be heated. In some embodiments, the mixture is stirred. In some embodiments, the rate of mixing is kept constant. Without wishing to be bound by any theory, the rate of mixing is kept constant to avoid solidification of the beads. The mixture containing the one or more metals or salts thereof can be heated, for example, for about, or at least, 1, 2, 3, 4, 5, 6, 7, 8, 9, or 10 hours. In some embodiments, the mixture is heated for about 1 to 10, 1 to 9, 1 to 8, 1 to 7, 1 to 6, 1 to 5, 1 to 4, 1 to 3, or 1 to 2 hours. In some embodiments, after heating, the mixture is allowed to cool. The cooling can be accelerated by incubating the mixture in a cooling bath or the reaction be cooled by exposing the reaction or reaction vessel to the ambient temperature.

In some embodiments, the polymeric beads comprising the one or more metals or salts thereof are isolated. The beads can be isolated once the reaction reaches room temperature. Any method of isolation can be used. In some embodiments, isolating the polymeric beads comprises filtration of the polymeric beads. In some embodiments, the method also comprises fractionating the polymeric beads to produce a composition comprising polymeric beads of substantially uniform diameter. Fractionating the beads based upon size allows the beads to be grouped according to a specific size or range of sizes. Any method of fractionating, such as but not limited using sieves, can be used. The isolated beads can also be washed with various solutions, such as, but not limited to, water, alcohol, acetone, and the like. In some embodiments, the beads are washed with water, methanol, or acetone, or any combination thereof. In some embodiments, the washing alcohol is ethanol, methanol, isopropanol, or any combination thereof.

In step (ii), the polymeric beads formed in step (i) are carbonized, for example, in a ceramic boat at a sufficient temperature and for a sufficient amount of time. In some embodiments, the beads are carbonized at a temperature in the range of from 900 to 1100° C., for example, at a temperature of about 900, 1000, 1050, or 1100° C. In some embodiments, the beads are carbonized for about 10, 20, 30, 40, 50, 60, 70, 80, 90, 100, 110, or 120 minutes. In some embodiments, the beads are carbonized in $N_2$ atmosphere. Other inert gases can also be used. In some embodiments, prior to the carbonization, the beads are pre-heated from room temperature to the carbonization temperature at a heating rate of about 1, 2, 3, 4, or 5° C./minute.

After carbonization, the beads may be activated. Activation of the beads can be performed in the same furnace that is used to carbonize the beads, but need not be. In some embodiments, the carbonized beads are activated by steam. In some embodiments, the beads may be activated at a temperature in the range of from 800 to 1100° C. In some embodiments, the beads may be conveniently activated at a temperature of about 800, 850, 900, 950, 1000, 1050, or 1100° C. In some embodiments, the carbonized beads are activated for about 10, 20, 30, 40, 50, 60, 70, 80, 90, 100, 110, or 120 minutes. In some embodiments, the beads are carbonized at a temperature of about 850° C. and the beads are activated at a temperature of about 1000° C.

The activated beads may then be subjected to reduction by hydrogen. Reduction of the beads can be performed in a similar furnace as that used to carbonize and activate the beads. The activated beads are reduced at 350° C. for 3 hours, thereby converting oxides of metals in the beads to the metallic state.

The metal nanoparticles-doped porous carbon beads that are produced by the methods described herein may have various sizes. However, it is preferred that the beads have a relatively uniform size distribution. If necessary, the beads can be manipulated, for example by milling or filtration, to reduce their size.

Preferably, beads which may be used as catalyst in the oxidation treatment step of the process of the present invention have diameters in the range of from 0.1 to 0.8 mm, more preferably in the range of from 0.2 to 0.8 mm. The bead diameters may be conveniently selected using sieves.

It is particularly preferred that the beads have an average diameter in the range of from 0.3 to 0.5 mm, and most preferably approximately 0.5 mm.

As mentioned hereinbefore, the polymeric beads are doped with one or more of aluminium, iron, nickel, copper, silver, cobalt, molybdenum, gold and platinum or salt(s) thereof. In embodiments wherein the polymeric beads are doped with two of the afore-mentioned metals or salts thereof, then the ratio of the two metals, or salts thereof, is preferably about 1:1, 1:2, 1:3, or 1:4.

The metal nanoparticles-doped porous carbon beads described hereinbefore have particular efficacy as a catalyst in processes for treating waste water originating from an industrial process for producing propylene oxide. Accordingly in the process of the present invention, waste water originating from an industrial process for producing propylene oxide is preferably subjected to a catalytic wet oxidation treatment in the presence of a catalyst comprising metal nanoparticles-doped porous carbon beads.

However, the above-mentioned catalyst comprising metal nanoparticles-doped porous carbon beads may further comprise carbon nanofibers.

Thus, the above-mentioned catalyst may be prepared by a method comprising steps (i) and (ii) as hereinbefore described, which method may further comprise a third step, step (iii), of subjecting the metal nanoparticles-doped porous carbon beads to chemical vapour deposition (CVD) in the presence of a carbon source to produce metal nanoparticles-doped porous carbon beads which comprise carbon nanofibers.

The above-mentioned carbon source may be selected from acetylene, benzene, xylene and toluene.

Methods for incorporating carbon nanofibers in metal nanoparticles-doped porous carbon beads are known in the art. For example, P. Khare et al., Chem. Eng. J. 229 (2013) 72-81 and N. Talreja et al., J. Water Process. Eng. 3 (2014) 34-45 both describe methods to grow carbon nanofibers on porous carbon beads.

A typical CVD set-up may consist of a nickel alloy tubular reactor (ID=30 mm, L=0.8 m) placed horizontally in an electric furnace equipped with a temperature controller and programmer. Approximately 20 g of the beads that have been pre-carbonized, activated and H2-reduced may be placed on a perforated stainless steel (SS) boat inserted into the reactor. Acetylene gas at a flow rate of 50 sccm ($cm^3$/min at standard temperature and pressure) was passed through the tubular reactor for CVD and the growth of carbon nanofibers (CNFs) on the activated carbon beads. The incorporated metal nanoparticles within the carbon beads act as the catalyst for the CVD. CVD may be performed at 350° C. for 30 minutes in the presence of acetylene in order to decorate the beads with multi-scale carbon structures in the form of carbon nanofibers (CNFs) at 0.1-0.15 MPa pressure.

Thus, the above-mentioned catalyst may be prepared by a method comprising steps (i), (ii) and (iii) as hereinbefore described, which method may further comprise a fourth step, step (iv), of doping the metal nanoparticles-doped porous carbon beads which comprise carbon nanofibers produced in step (iii) with an oxidant.

Preferably, said oxidant is the salt of a strong base and a weak acid. Potassium and ammonium salts of a strong base and a weak acid are particularly preferred as oxidants. More preferably, said oxidant is selected from one or more of $KMnO_4$, $K_2S_2O_8$ and $(NH_4)_2S_2O_8$.

A general procedure for carrying out step (iv) may include mixing the metal nanoparticles-doped porous carbon beads comprising carbon nanofibers produced in step (iii) with aqueous solutions comprising the oxidant at a temperature in the range of from 40 to 60° C. for a period of from 4 to 12 hours.

The oxidant for use in step (iv) may be conveniently used in water.

After mixing, the catalyst may then be filtered and dried prior to use.

EXAMPLES

1) Preparation of Oxidation Treatment Catalyst

Copper nanoparticle-doped polymer beads were prepared by suspension polymerization. The polymerization reaction was performed in a 2-litre three-neck glass vessel mounted over a heating mantle and equipped with a reflux condenser, thermometer and continuous stirrer.

A detailed description of the equipment that may be used for the polymerization reaction can be found in Chem. Eng. Sci. 3591 (2010). Furthermore, FIG. 3 of US 2015/0056260 A1 illustrates an example apparatus that may be conveniently used for preparing metal nanoparticle-doped carbon beads by suspension polymerization.

A solution of phenol (50 g) as monomer, formaldehyde (63 ml) as solvent and triethylamine (TEA) (1.5 ml) as polymerization catalyst was prepared. Thereafter, the mixture of phenol, formaldehyde and TEA was stirred (370-410 rpm) at room temperature (approx. 30° C. ° C.) for 8 hours to prepare a homogenous solution.

After 8 hours, 200 ml of water was mixed into the reaction mixture. After a further 30 minutes, 3.5 g of hexamethylenetetramine (HMTA) was added as the cross-linking agent and the reaction mixture was simultaneously heated at 3° C./min until the temperature reached 100° C. Approx. 45 minute after the addition of HMTA, 3.5 g of PVA (95% hydrolyzed polyvinyl alcohol, average molecular weight 95000) was added as a suspension stabilizing agent.

After 25-30 minutes, 4 g of copper nitrate ($Cu(NO_3)_2 \cdot 3H_2O$) was added. After 30 minutes, the reaction was stopped by switching off the heater. The reaction mixture was then allowed to cool to room temperature.

After cooling, the reaction mixture was filtered to separate solids beads from the residual liquid. The beads were then washed 2-3 times with water, methanol and acetone and then dried at room temperature for 12 hours. The formed copper nanoparticle-doped polymer beads were then sieved and a yield of approx. 50 g was obtained.

Said copper nanoparticle-doped polymer beads prepared by the method of Example 1 were carbonized at 900° C. for 2 hours in presence of nitrogen, and then activated at 900° C. for 1 hour in presence of steam at 0.1-0.15 MPa pressure to form copper oxide doped porous activated carbon beads. Thereafter, the copper oxide doped porous activated carbon beads were reduced at 350° C. for 2 hours in presence of hydrogen at a flow rate of 150 sccm ($cm^3$/min at standard temperature and pressure) and 0.1-0.15 MPa pressure to form copper nanoparticles-doped porous carbon beads.

Said copper nanoparticles-doped porous carbon beads were subsequently subjected to Chemical Vapor Deposition (CVD) at 350° C. for 30 minutes in presence of acetylene at a flow rate of 100 sccm ($cm^3$/min at standard temperature and pressure) in order to decorate the beads with multi-scale carbon structures in the form of carbon nanofibers (CNFs) at 0.1-0.15 MPa pressure.

Said copper nanoparticles-doped carbon nanofiber porous carbon beads were additionally treated with oxidant by impregnating them with $KMnO_4$ by mixing the beads with an aqueous solution of $KMnO_4$ at 55° C. $KMnO_4$ salt solution was separately prepared by mixing 0.8 g of the as-received salt in 15 ml of water at room temperature. Approximately 0.3 g of the beads from Example 3 were mixed with 15 ml of aqueous $KMnO_4$ solution in a beaker. The doping of the beads was performed at 55° C. for 8 h. The potassium salt-doped beads were vacuum-dried at 55° C. for 30 min.

2) Oxidation Treatment Experiments

The catalyst beads as prepared in Section 1) above were used in Experiments 1-6 wherein a waste water stream obtained from an industrial styrene monomer/propylene oxide (SM/PO) production process was treated. Said experiments involved subjecting the waste water to a wet oxidation treatment in the presence of said catalyst beads.

In the experiments, the waste water stream was fed to a reactor having a downflow configuration, which reactor contained the above-mentioned catalyst beads. The catalyst was used in an amount (in grams) per the feed rate of said waste water stream (in litres per hour) of 100 g/(l/h) for Experiments 1-3 and 6 and 75 g/(l/h) for Experiments 4-5.

The reactor was a vertical tubular reactor which contained the catalyst beads supported on glass wool. The reactor was a nickel alloy (available under the trade designation "Inconel") reactor (73 mm diameter×210 mm height×7 mm wall-thickness), equipped with an electric heater and a thermocouple. A PID temperature controller (PID=Proportional Integral Derivative) was used for maintaining the reaction temperature. A pressure gauge was used to monitor the reactor inlet pressure.

Prior to starting the liquid flow (waste water stream feed), a gas stream comprising oxygen and nitrogen was fed separately to the reactor to pressurize the reactor. Said gas stream was generated by combining a pure oxygen stream with an air stream. The combined gas stream comprised a mixture of air and (pure) oxygen, wherein the total pressure was 27 bar composed of 15 bar of air and 12 bar of (pure) oxygen.

Directly after starting the liquid flow, the pressure in the reactor was maintained by feeding pure oxygen. Said pure oxygen stream had a flow rate of 1 sccm ($cm^3$/min at standard temperature and pressure).

The reactor pressure was 27 bar and the temperature in the reactor is shown in Table 1 below. In the reactor, the waste water was subjected to an oxidation treatment in the presence of oxygen and the catalyst beads. The resulting treated stream leaving the reactor was cooled by means of a heat exchanger (cooler). The cooled treated stream was then sent to a liquid-gas separator, which was comprised of a T-piece in the outlet line, wherein said stream was separated into a gas stream and a liquid stream. The liquid stream leaving the separator was split into 2 substreams. One of these substreams from the recycle line (hereinafter "recycle stream") was then combined with the waste water stream and then recycled to the reactor. The other substream (hereinafter "non-recycle stream") was discarded via a product line. The pressure in the reactor system, including the cooler, was controlled by a pressure regulator in the outlet for the gas stream originating from the liquid-gas separator.

The experiments were carried out continuously. After the start of an experiment, the COD (Chemical Oxygen Demand) of the liquid stream leaving the separator started to decrease. Each experiment lasted for 5 hours. After completion of an experiment and before starting a new experiment, the reactor and associated tubing were flushed with water to remove any deposition and residuals.

Table 1 below shows further details of the experiments and the results of the waste water treatment in terms of COD reduction. Two sets of experiments were carried out. In Experiments 1-3 the waste water had a relatively low initial COD, whereas in Experiments 4-6 the waste water had a relatively high initial COD.

TABLE 1

| Exp. | Reactor temperature (° C.) | Catalyst loading (g) | Flow rate non-recycle stream (ccpm)[1] | Flow rate recycle stream (ccpm)[1] | Recycle portion (%)[2] | Initial COD (mg/L) | Final COD (mg/L) | COD conversion (%)[3] |
|---|---|---|---|---|---|---|---|---|
| 1(*) | 220 | 6 | 1 | 0 | 0 | 34,339 | 15,838 | 54 |
| 2 | 220 | 6 | 1 | 5 | 83 | 32,237 | 10,091 | 69 |
| 3 | 220 | 6 | 1 | 9 | 90 | 35,040 | 8,269 | 76 |
| 4(*) | 230 | 9 | 2 | 0 | 0 | 118,560 | 27,360 | 77 |
| 5 | 230 | 9 | 2 | 1 | 33 | 111,264 | 3,526 | 97 |
| 6 | 230 | 12 | 2 | 1 | 33 | 114,304 | 1,508 | 99 |

(*) = not according to the invention;
COD = Chemical Oxygen Demand
[1] ccpm = cm$^3$/min or ml/min (at operating conditions). Flow rate non-recycle stream = feed rate waste water stream before the latter is combined with the recycle stream.
[2] Recycle portion = (flow rate of stream in recycle line/[total flow rate of streams in product line and recycle line])*100
[3] COD conversion = [1-(final COD/initial COD)]*100

Table 2 below depicts the typical properties of waste water generated from an industrial SM/PO production process, wherein propylene oxide (PO) is produced.

TABLE 2

| Property | Unit of measurement | Values |
|---|---|---|
| Starting COD | mg/l | 80,000-125,000 |
| Sum of organic sodium salts (formate, acetate, propionate, benzoate) | mg/l | 35,000-42,000 |
| Propylene glycol | mg/l | 4000-9000 |
| Phenol | mg/l | 1500 |
| Aromatic oxygenates (mainly $C_8/C_9$) | mg/l | 3000-3500 |
| Density | kg/m$^3$ | 1030-1050 |
| pH | | ~10 |
| Na$^+$ in $Na_2CO_3/HCO_3$ | mg/l | 8500-10,000 |

In Experiments 4-6 (see Table 1), the initial COD falls in the range of 80,000-125,000 for starting COD mentioned in Table 2. The waste water treated in Experiments 1-3 (see Table 1) was also waste water obtained from an industrial SM/PO production process, but said waste water had first been diluted with water resulting in a lower initial COD.

As can be seen, for all of said Experiments 1-6, the COD of the waste water is advantageously reduced significantly by recycling part of the treated and separated liquid stream to the reactor. Further, Experiments 1-3 show that by increasing the recycle portion, the COD of the waste water is further reduced. Further, in particular, Experiments 4-6 show that by applying the waste water treatment process of the present invention, a relatively high COD which is typical for waste water from the SM/PO process can advantageously be reduced by even 97-99% (at a recycle portion of only 33%). The foregoing demonstrates the surprising efficiency of the process of the present invention.

That which is claimed is:

1. A process for treating wastewater comprising subjecting the wastewater to a catalytic wet oxidation treatment comprising:
    feeding a stream comprising the wastewater to a reactor, wherein the wastewater is from an industrial process for producing propylene oxide containing hydrocarbons and salts;
    subjecting the stream comprising the wastewater to an oxidation treatment in the presence of oxygen and a catalyst resulting in a treated stream;
    sending the treated stream to a separator wherein the treated stream is separated into a gas stream and a liquid stream; and
    recycling part of the liquid stream to the reactor.

2. The process according to claim 1, wherein the oxidation treatment step is conducted at a temperature in the range of from 120 to 300° C. and a pressure in the range of from 2 to 20 MPa.

3. The process according to claim 1, which is carried out in a continuous manner.

4. The process according to claim 1, wherein a gas stream comprising oxygen and optionally an inert gas is fed to the reactor.

5. The process according to claim 4, wherein the amount of oxygen in the gas stream comprising oxygen and optionally an inert gas is in the range of from 1 to 100 vol. %.

6. The process according to claim 4, wherein the gas stream comprising oxygen and optionally an inert gas is a gas stream consisting of air or a gas stream consisting of a combination of air and an additional amount of one or more inert gases.

7. The process according to claim 4, wherein the gas stream comprising oxygen and optionally an inert gas is a gas stream wherein the oxygen concentration is higher than that in air.

8. The process according to claim 1, wherein the catalyst is used in an amount (in grams) per the feed rate of the stream comprising the wastewater (in litres per hour) in the range of from 10 to 300 g/(l/h).

9. The process according to claim 1, wherein of from 1 to 99 vol % of the liquid stream separated by the separator is recycled to the reactor.

10. The process according to claim 1, wherein the catalyst comprises metal nanoparticles-doped porous carbon beads.

11. The process according to claim 1, wherein the wastewater before treatment in accordance with the process has a chemical oxygen demand value in the range of 80,000 to 125,000 mg/L.

* * * * *